United States Patent [19]

Haeusler

[11] 4,141,032
[45] Feb. 20, 1979

[54] METHOD OF AND APPARATUS FOR THE EXPANSION OF THE RANGE OF THE DEPTH OF FOCUS BEYOND THE LIMIT GIVEN BY CONVENTIONAL IMAGES

[75] Inventor: Gerd Haeusler, Erlangen, Fed. Rep. of Germany

[73] Assignee: Ernst Leitz Wetzlar GmbH, Wetzlar, Fed. Rep. of Germany

[21] Appl. No.: 805,159

[22] Filed: Jun. 9, 1977

[30] Foreign Application Priority Data

Dec. 8, 1976 [DE] Fed. Rep. of Germany ....... 2655525

[51] Int. Cl.² ............................................. H04N 9/54
[52] U.S. Cl. .................................................... 358/89
[58] Field of Search .................. 358/89, 88, 160, 209, 358/225

[56] References Cited

U.S. PATENT DOCUMENTS 2,513,176  6/1950  Homrighous .......................... 358/89
3,536,921  10/1970  Caulfield ................................ 358/89

Primary Examiner—Richard Murray
Attorney, Agent, or Firm—Richard L. Schwaab

[57] ABSTRACT

A method of and apparatus for increasing the range of depth of focus when optically imaging three dimensional objects having different depth ranges corresponding to desired image levels wherein the object is focused through at a plurality of levels to produce a plurality of images. At each level, the image produced has sharp details and unfocused details. Each image is filtered with a high pass filter to suppress unfocused details and to pass sharp details. The images are then summed to produce a composite image containing only the sharp details passed by the filtering step. If desired, the filter may be selectively by-passed in order to sum unfiltered images. By utilizing the method of an apparatus for practicing the instant invention more meaningful visual displays of three-dimensional objects are obtained.

14 Claims, 11 Drawing Figures

METHOD OF AND APPARATUS FOR THE EXPANSION OF THE RANGE OF THE DEPTH OF FOCUS BEYOND THE LIMIT GIVEN BY CONVENTIONAL IMAGES

BACKGROUND OF THE INVENTION

This invention concerns a method for the expansion of the range of the depth of focus in the optical imaging of three-dimensional objects, as well as an apparatus for its implementation.

A method for increasing the range of the depth of focus is known from German Pat. No. 2,301,800, where, in a first step, an object to be imaged is uniformly moved along the optical axis of the system, whereby, through the superposition of various defocussed images, a modified image of the object is produced. In a second step, the image thus obtained is subjected to a high pass filter, resulting in a compensation in the contrast decrease which has developed at high local frequencies. The integration carried in the first step of this known method can be performed on a photoplate or, if the motion of the object is fast enough, on a vidicon. If the range of integration becomes greater than the depth of the object, the integrated image will be characterized in that all level positions of the object are imaged with almost equal contrast transfer function, which decreases approximately as the function 1/s at higher local frequencies. For this reason, the integrated image, which evidences low contrast at high local frequencies, can be filtered back by a second step in accordance with the known method. In this case, it is necessary that the characteristic of the filter which is used has an essentially linearly increasing response with a maximum amplification V at V-times the expansion of the depth of focus.

In the method disclosed in German Pat. No. 2,301,800, because of unavoidable noise which occurs, for example, in the electronic high pass filtering of a vidicon signal, the range of the expandable depth of focus is limited to a range of ten to fifteen times. Furthermore, the motion of the object must be exactly in the direction of the optical axis of the imaging system, in rapid sequence, which necessitates using expensive apparatus.

SUMMARY OF THE INVENTION

In view of the foregoing considerations, it is an object of this invention to provide an improved method of and an apparatus for expanding the range of the depth of focus of an optical imaging system, wherein the range is not limited by the noise of a receptor or of storage.

It is another object to provide a method of and an apparatus for expanding the range of the depth of focus of an optical imaging system in which rapid motion of the object along the optical axis of the system is not necessary, because the inertia problems of a vidicon are no longer present.

It is a further object to provide an improved method of and apparatus for expanding the range of the depth of focus of an optical imaging system wherein a dark-field image of three-dimensional objects is simulated and, if necessary, a continuous transition from the dark-field image to the bright-field image is accommodated.

It is a further object of this invention to provide a method of and apparatus for expanding the range of focus of an optical imaging system wherein, only one filter suffices for any desired expansion of the depth of focus.

With the foregoing objects in mind, the instant invention contemplates a method for increasing the range of depths of focus when optically imaging three-dimensional objects having different depth ranges corresponding to desired image levels wherein the following steps are performed;

a. focusing through the object at a plurality of levels to produce a plurality of images wherein each image has sharp details and unfocused details;

b. filtering each image with a high-pass filter to suppress unfocused details and to pass sharp details; and c. summing the images passed by the filtering step to produce a composite image containing only the sharp details passed by the filtering step.

This method may further include the steps of increasing the frequency response of the filter for each image filtered and, if necessary or desired, increasing the fequency response linearly. Furthermore, the filter may be selectively by-passed and an unfiltered image blended with the filtered image in a selected ratio to produce a desired image. The method also contemplates partial focusing steps for each level wherein the partial focusing steps are summed to produce a composite image at each level.

In practicing the aforecited method steps the instant invention contemplates an apparatus which includes the following structure:

a. objective means for focusing through the object;

b. means for moving the object and objective means relative to one another to bring selected levels of the object into sharp focus;

c. means for producing images of the object as the object appears at said selected levels;

d. means for filtering the images produced by the image producing means wherein said filtering means includes a high pass filter which suppresses unfocused details of the images and passes sharp details; and e. means for summing the images passed by the filtering means to produce a composite image which clearly portrays the three dimensional object.

Further special objects, features and advantages of the invention will become apparent from the following description, when taken together with the accompanying drawings which illustrate several optical systems which are present in the various figures.

BRIEF DESCRIPTION OF THE DRAWINGS

FIG. 3a is a graphical illustration of the intensity pattern of the integrated image of the light object point illustrated in FIG. 2a;

DESCRIPTION OF THE PREFERRED EMBODIMENT

In accordance with this invention, the problem of expanding the range of the depth of focus of an optical imaging system is solved through focusing a large number of images of an object at various levels, so that unsharp details of the object at each level are suppressed through filtering with a filter having essentially high pass characteristics. Upon summing these filtered images, a complete clear image of the three-dimensional object is composed. In this case, the filter may have increasing (preferably essentially linearly increasing) frequency response. According to the method of this invention, an admixture or blending of the particular unfiltered image with the filtered image can advantageously be achieved.

The admixture ratio may be variable and freely selectable. It is also possible to carry out the through focusing in defined partial steps, whereby selection of the sequential partial steps is accomplished so that they are preferably equal to the conventional depth of focus. An apparatus for carrying out this method, in accordance with this invention, is characterized in that, for the summing of the filtered images, a storage system is used, such as, for example, a vidicon storage, a magnetic disc storage, or a digital storage. For the exact solution these storage devices have to be enabled to store intermediately positive and negative videosignals, according to positive and negative intensities.

Figure 1:
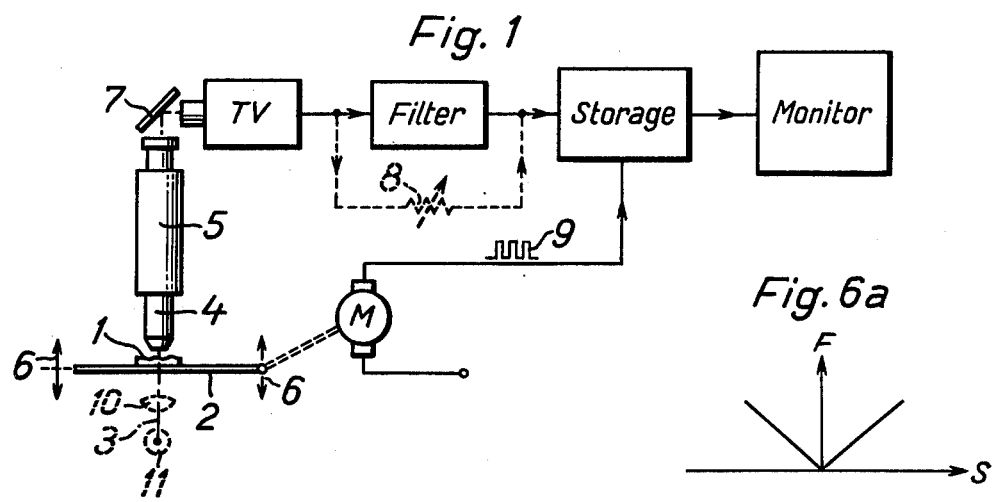
FIG. 1 is a basic block diagram illustrative of the method in accordance with this invention, and an example of the apparatus for carrying out the method.

Referring now to FIG. 1, where the principal pattern of the method is explained in greater detail by means of the block diagram, an object 1, the details of which are at various depths with respect to the vertical optical axis 3 of an optical system, is located on viewing table 2, which is adjustably arranged, by means of a motor M, in the direction of an optical axis 3. The direction of translation is indicated by double arrows 6. A microscope tube or barrel 5, containing an objective 4, is here illustrated as being used for an imaging optical system. As an example of an illumination arrangement, a light condensor 10 focuses light from a lamp 11 (illustrated in dotted lines). On the other hand, a surface illumination device could be used to provide a dark-field and light-field illuminating device. In the illustrated embodiment, the image information from the object is fed into a vidicon camera through a deflecting mirror 7. When the motor M is turned on, the apparatus uniformly focusses through the object 1. After separation of the synchronizing impulse, the vidicon signal which is thus obtained is fed into a filter and, for example, after object displacement steps of 0.2μ, is stored in a vidicon storage. In addition, control impulses 9, derived from the motion of the motor M, are fed into the vidicon storage to determine which portions of the vidicon signal are stored. Following a focusing through scan, which, in accordance with object depth and the numerical aperture which is used takes place in a time interval in the range of several tenths of a second to several seconds, the complete filtered total image can be seen on the monitor.

For the purpose of blending the particular unfiltered image with the filtered image, a bypass line, which is illustrated in the figure as a dotted line and which bypasses the filter can be used, through which the unfiltered information reaches the storage. A regulator 8, provided in this line, allows variation of the blending ratio.

Figure 2A:
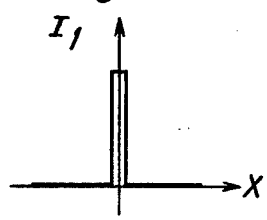
FIG. 2a is a graphical illustration of a light object point on dark background in a system of coordinates.
Figure 2B:
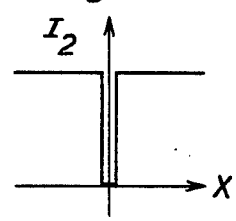
FIG. 2b is a graphical illustration of a dark object point on light background in a system of coordinates.
Figure 3A:
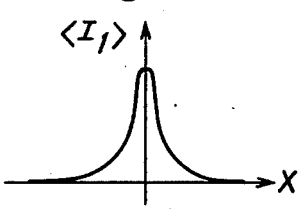

The method in accordance with this invention is now explained in further detail by reference to additional FIGS. 2a to 6b. The method begins with the recognition that, in focusing through and integration (summing), the contrast decreases considerably at higher local frequencies. The intensity distribution curve $I_1$ of a light point on a dark background is illustrated in FIG. 2a. After the integration of this object, a point image with a broad halo results. FIG. 3a shows the pattern of the intensity distribution $<I_1>$. The intensity distribution $I_2$ of a dark point on a light background is illustrated in FIG. 2b.

Figure 3B:
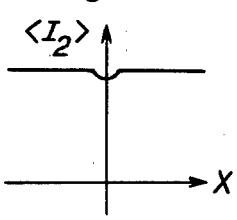
FIG. 3b is a graphical illustration of the intensity pattern of the integrated image of the dark object point illustrated in FIG. 2b.

As illustrated in FIG. 3b by curve $<I_2>$, integration reduces the contrast considerably for this object.

When focusing through, the light from light surroundings almost always contributes to the illumination at $x = 0$, with the exception of short time intervals when the object is sharply focused. Accordingly, strongly unfocussed details must not be permitted to load the dynamics of the receptor. In accordance with the invention, this is carried out through filtering of the image with a filter, which raises the high image frequencies. In this manner, the focussed details are weighted more than the unfocussed portions. For example, in the case of extreme misfocus, the image is merely a blurred grey area, which the filter blocks as an undesired signal. If the various levels of the object are recorded sequentially, and if the signals which are thus generated are further processed in the above manner, the desired image of the three-dimensional object is obtained.

The method which has so far been described fundamentally, can be mathematically explained as follows:

The unfocused detail with unfocusing $\alpha$, $$\alpha = \tfrac{1}{2} k \sin^2 u,$$

is imaged with the transfer function $$D(s,\alpha) = \frac{1}{2\alpha |s|} \cdot \sin(2\alpha |s| - \alpha s^2) \tag{1}$$

where, u is the aperture, k a factor $2\pi/\lambda$ and s is the local frequency.

If filtering now takes place, for example, with a filter function $$F(s) = \frac{2}{\pi} |s| \tag{2}$$

the relationship $$D_F = \frac{\sin(2\alpha |s| - \alpha s^2)}{\pi \cdot \alpha}$$

is obtained.

After averaging over $\alpha$, the following equation results (Si is the integral sine):

$$<D_F> = \int_{-\alpha_1}^{\alpha_1} D_F(s,\alpha)d\alpha = \frac{2}{\pi} Si\,[\alpha_1(2|s| - s^2)]$$

The transfer function $<D_F>$ is not only valid for the middle plane, but approximately for all planes, when $\alpha_1$ is greater than the object depth.

The pattern of $<D_F>$ is to be used as the example for a 32 times expansion of the depth of focus.

Figure 4:
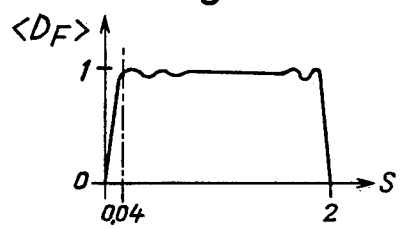
FIG. 4 is a graphical illustration of a filtered and integrated transfer function for a thirty-two fold expansion of the depth of focus of the apparatus, if a linearly increasing filter function has been applied.
Figure 5A:
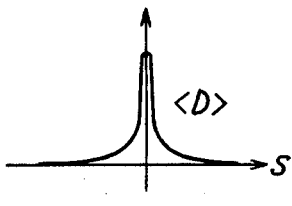
FIG. 5a is a graphical illustration of the basic pattern of the integrated transfer function.
Figure 5B:
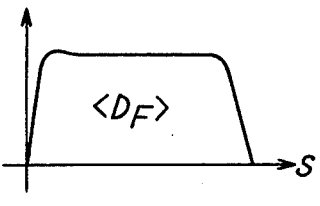
FIG. 5b is a graphical illustration of the basic pattern of the filtered and integrated transfer function.
Figure 5C:
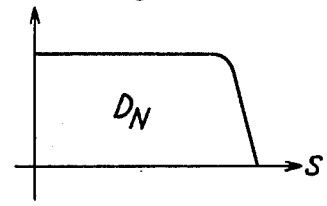
FIG. 5c is a graphical illustration of a total contrast transfer function resulting from summing of the functions illustrated in FIGS. 5a and 5b (without dark field characteristic)

The theoretical curve pattern of the contrast transfer function is illustrated in FIG. 4, where the local frequency s is plotted on the abscissa and the contrast transfer function $<D_F>$ on the ordinate.

With the exception of a very close range around zero frequency, the contrast transfer function is constant. Only the uniform portion is separated. In the case of the linear filter F(s), a dark field characteristic of the finished image is thus obtained. This results from the fact that the reduction of contrast, which has so disturbing during focusing through the object, was prevented by high pass filtering.

If the dark-field effect is undesirable, the filter must be so dimensioned so that the low frequencies are also partly passed. The exact pattern results from the inverted function of FIG. 5a. A simpler approximate solution, which requires only one filter for any desired expansion of the depth of focus, is the blending of unfiltered images. This can be simply realized by bypassing the filter and, through the appropriate attenuation of the electrical signal passing through the bypass. The integrated transfer function $<D>$ (FIG. 5a) and the filtered, integrated contrast transfer function $<D_F>$ (FIG. 5b) are thus mixed and a total contrast transfer function $D_N$ (FIG. 5c) without dark-field characteristic is thus obtained.

Figure 6A:
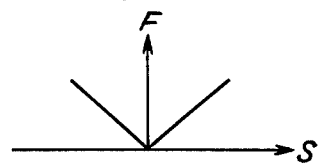
FIGS. 6a and 6b are graphical illustrations of various filter characteristics.
Figure 6B:
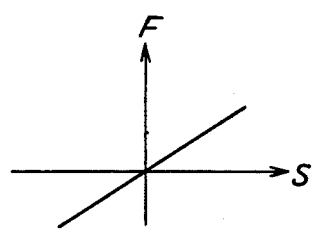

There are various possibilities for dimensioning of the filter, as illustrated, for example, in FIGS. 6a and 6b. On the one hand, it is possible to configure the filter in such a manner that its charactertistic has the pattern plotted in FIG. 6a. With the use of this filter, a high pass image is obtained, which, after the admixture or blending of the unfiltered integrated image, can be modified into a bright-field image. It is also possible to use digital filtration.

The use of a filter, which has a characteristic as indicated in FIG. 6b, results in a Hilbert transformation (relief effect). The filtered video signal generally contains negative potentials, which correspond to negative intensities. These negative values must also be stored for an exact realization of the above described integration. One possibility or way of avoiding negative signals is to add a D. C. voltage.

For the exact solution, these storage devices have to be enabled to store intermediately positive and negative videosignals, according to positive and negative intensities.

If negative signals are cut off by half-wave rectification—for example, on the tube or in the storage—a modified image of the object is thus obtained. This is also possible with full-wave rectification of the filtered image.

The method in accordance with this invention is not limited to a specific incoherent type of illumination.

In the present case, "focusing through" is to be understood as meaning a variation of the distance between the objective 4 of an optical system and the object 1, and/or a defined plane or image level of this object, or observed with the objective. Such a variation can be obtained in various ways. On one hand, this distance can be obtained through a change of the position of the objective 4, and, on the other hand, through a change of the position of the object 1 along the optical axis 3. Finally, the simultaneous change of the positions of the object 1 and of the objective 4 in the opposite direction is also conceivable. It is also within the scope of this invention to use a photographic camera (not shown) instead of an electronic storage for summing of the filtered individual images. With an opened shutter, the filtered individual images appearing sequentially on the monitor are photographically superimposed.

Filtering should generally by two-dimensional. However, in many cases unidimensional filtering suffices, whereby the filter is of a simpler design.

Although, in the embodiment of the method in accordance with this invention, a light-optical apparatus as illustrated and described, the method can also be applied with apparatus working in accordance with an electro-optical system.

What is claimed is:

1. A method for increasing the range of depths of focus when optically imaging three dimensional objects having different depth ranges corresponding to desired image levels comprising the steps of:

focusing through the object at a plurality of levels to produce a plurality of images wherein each image has sharp details and unfocused details;

converting each image to an electrical signal pattern;

filtering each electrical signal pattern to suppress unfocused details and to pass a filtered electrical signal pattern including only substantially sharp details; and summing the filtered electrical signal patterns to produce a composite electrical signal pattern representing a composite image containing only the sharp details passed by the filtering step.

2. The method of claim 1 wherein the filtering step is performed through a high pass filter and includes the step of increasing the frequency response of the filter for each image filtered.

3. The method of claim 2 wherein the frequency response is increased linearly.

4. The method of claim 2 wherein the frequency response follows an inverse of an integrated transfer function in order to restore the transfer function exactly.

5. The method of claim 1 further including the step of blending the filtered electrical signal pattern with the unfiltered signal pattern by bypassing the filtering step selectively according to a selected ratio and by summing the filtered and unfiltered electrical signal patterns.

6. The method of claim 1 wherein the focusing step for each image level includes focusing in a series of steps wherein for each step the focus is partially clear to thereby produce a plurality of partially clear images which are converted to an electrical signal pattern and summed to produce an electrical signal pattern which is representative of the image for that level.

7. The method of claim 1 wherein the step of converting each image to an electrical signal pattern is accomplished with a video camera and wherein the electrical signal patterns are video signals.

8. The method of claim 7 further comprising the steps of storing the video signals after they are summed and displaying the stored video signals.

9. An apparatus for increasing the range of depths of focus when optically imaging a three-dimensional object having different depth ranges corresponding to desired image levels, said apparatus comprising:
- objective means for focusing through the object;
- means for moving the object and objective means relative to one another to bring selected levels of the object into sharp focus;
- means for producing images of the object as the object appears at said selected levels;
- means for converting the images to electrical signal patterns;
- means for filtering the electrical signal patterns wherein said filtering means includes a high pass filter which suppresses portions of the electrical signal patterns representing unfocused details of the images and passes portions of the electrical signal patterns representing sharp details to produce filtered electrical signal patterns; and
- means for summing the filtered electrical signal pattern to produce a composite electrical signal pattern which represents a composite image clearly portraying the three dimensional object.

10. The apparatus of claim 9 further including bypass means for bypassing said filter to apply an unfiltered electrical signal pattern to said summing means which is summed with an electrical signal pattern representing a filtered image.

11. The apparatus of claim 9 further including storage means for storing an electrical signal pattern representing each image as that electrical signal pattern is filtered.

12. The apparatus of claim 11 wherein the means for converting the images to electrical signal patterns is a video camera.

13. The apparatus of claim 12 wherein the storage means is a video signal storage device.

14. The apparatus of claim 13 further including a video monitor for displaying the images stored in said storage means.

* * * * *